(12) United States Patent
French

(10) Patent No.: US 12,220,943 B2
(45) Date of Patent: Feb. 11, 2025

(54) DRIVING MECHANISM OF BICYCLE FREE-COASTER HUB

(71) Applicants: TEDDY FORMOSA CO., LTD., Taichung (TW); BEAR CORPORATION, Norwalk, CA (US)

(72) Inventor: George French, Sheffield (GB)

(73) Assignees: TEDDY FORMOSA CO., LTD., Taichung (TW); BEAR CORPORATION, Norwalk, CA (US)

( * ) Notice: Subject to any disclaimer, the term of this patent is extended or adjusted under 35 U.S.C. 154(b) by 382 days.

(21) Appl. No.: 17/882,804

(22) Filed: Aug. 8, 2022

(65) Prior Publication Data

US 2023/0066122 A1    Mar. 2, 2023

(30) Foreign Application Priority Data

Aug. 25, 2021  (TW) .................................. 110131498
Oct. 18, 2021  (TW) .................................. 110212252
Apr. 1, 2022   (TW) .................................. 111203381

(51) Int. Cl.

| B60B 27/04 | (2006.01) |
| B60B 27/00 | (2006.01) |
| B60B 27/02 | (2006.01) |
| B60B 35/12 | (2006.01) |
| B62M 11/16 | (2006.01) |

(Continued)

(52) U.S. Cl.
CPC ........ *B60B 27/047* (2013.01); *B60B 27/0021* (2013.01); *B60B 27/023* (2013.01); *B60B 35/125* (2013.01); *B62M 11/16* (2013.01); *F16D 41/28* (2013.01); *F16D 41/30* (2013.01); *F16D 41/34* (2013.01); *F16H 1/28* (2013.01)

(58) Field of Classification Search
CPC .. B62M 11/16; B60B 27/047; B60B 27/0021; B60B 27/023; B60B 27/0026; B60B 35/125; F16D 41/28; F16D 41/30; F16D 41/34; F16H 1/28
See application file for complete search history.

(56) References Cited

U.S. PATENT DOCUMENTS 3,995,503 A  *  12/1976  Schulz .................... F16D 41/30
                                                    475/299
4,615,423 A  *  10/1986  Klauke ................. B60B 27/023
                                                    192/64

(Continued)

*Primary Examiner* — Timothy Hannon
(74) *Attorney, Agent, or Firm* — Birch, Stewart, Kolasch & Birch, LLP

(57) ABSTRACT

A driving mechanism of a bicycle free-coaster hub includes a driving assembly, a clutch assembly, an epicyclic gear assembly, a resisting member, and forward drag and reverse drag members. The clutch assembly includes an output clutch unit disposed inner the hub and an input clutch unit disposed with the driving assembly to form a clutching or engaging state with the output clutch unit. The epicyclic gear assembly includes a sun gear coupled with the input clutch unit, a ring gear mounted on the hub, a planet gear carrier having a plurality of planet gears engaged with the ring gear and the gear portion of the sun gear. The resisting member is disposed between the sun gear and the hub axle. The forward drag member is disposed between the ring gear and the sun gear. The reverse drag member is disposed between the planet gear carrier and the hub axel.

13 Claims, 17 Drawing Sheets

(51) Int. Cl.
*F16D 41/28* (2006.01)
*F16D 41/30* (2006.01)
*F16D 41/34* (2006.01)
*F16H 1/28* (2006.01)

(56) References Cited

U.S. PATENT DOCUMENTS

2002/0179394 A1* 12/2002 Wu ................ F16D 41/34
                                                        192/64
2012/0083383 A1* 4/2012 Steuer ............ F16D 41/26
                                                        192/41 R
2017/0101161 A1* 4/2017 Cohen .............. B62M 1/36
2018/0045279 A1* 2/2018 Park ............... B62M 11/18

* cited by examiner

DRIVING MECHANISM OF BICYCLE FREE-COASTER HUB

FIELD

The disclosure relates to bicycle hubs, and particularly to a driving mechanism of a bicycle free-coaster hub.

BACKGROUND

Typical driven bicycle hubs operate through some form of over-running clutch. Often this is a simple ratchet mechanism that allows any forward drive relative to the wheel to engage the hub. A drawback of this arrangement is that any attempt to move the bicycle backwards is indistinguishable from forward drive to the mechanism and so forces the cranks and pedals to rotate backwards. For riders who wish to ride backwards (e.g., for trick riding) this is inconvenient.

A large number of different designs of hubs to counter this problem have been devised. By and large these hubs work by only engaging drive to the hub when the drive mechanism moves forward relative to the bicycle. These are generally referred to as "Freecoaster" hubs. Unfortunately, if the rider is unable to keep their feet still while riding backwards and they inadvertently pedal forwards while rolling backwards this can result in a sudden engagement of drive which immediately transmits torque at the wheel back through the chain to the cranks, forcing the cranks to rotate backwards with considerable force which can unseat the rider in a dangerous way and put large loads through the drive train.

To counteract this possibility, freecoaster hubs are often made with a large degree of backlash or "slack" before engagement occurs. Such that the rider needs to make a large pedaling motion before drive engages. This reduces the chances of accidental engagement of the drive. Unfortunately, having this large degree of slack is undesirable when pedaling the bicycle forwards. It makes acceleration slower and pedaling engagement more jerky. Furthermore, the rider must deliberately reset this slack to ensure that drive is not accidentally engaged. That is, after pedaling, and before turning the bicycle around to coast backwards, the rider should back-pedal slightly to re-open the slack or "gap" between the drive elements and the driven part of the hub.

Additionally, this slack or "gap" can be inconsistent. So, if a hub is designed such that the maximum slack/gap is a quarter turn at the pedal, the rider would need to back-pedal at least a quarter turn to fully open the gap. If the rider misjudges this and only back-pedals a tenth of a turn, or if the drive mechanism is shaken by an impact such as landing from a trick/jump, then the angle of pedal movement before engagement may well be less. This member that a rider can never quite be sure how much they will need to pedal before engaging drive. If drive engages sooner or later than expected it can throw off the rider's balance and possibly even cause the rider to come off the bicycle. To counteract this, riders will often pedal very cautiously initially to ensure drive is properly engaged before pedaling hard to gain speed, this can waste precious time or space for acceleration between tricks.

A hub design has been disclosed that attempts to partially remedy these problems by constantly biasing the drive elements of the hub against the direction of wheel rotation; such that forward movement of the hub biases the elements towards engagement and backward movement of the hub biases the elements out of engagement. Unfortunately, this approach still has its flaws. It allows for an undesirable outcome in the situation where the wheel of the bicycle is spinning forwards (for example in the air during a jump) immediately before landing rolling backwards. Because the forward spinning wheel is constantly biasing the drive elements into engagement there is a good chance that, on landing, they will engage before the wheel has rotated backwards enough to pull them out of engagement. The result of this is that the drive may be forcibly engaged on landing and again throw the rider from the bicycle by the sudden forceful backward movement of the cranks.

SUMMARY

Therefore, one of the objectives of the disclosure is to provide a driving mechanism of a bicycle free-coaster hub which can maintain a constant gap or slack between the driving system of the bicycle hub and the driven element when the bicycle wheel is coasting backward or when the bicycle is freewheeling forwards.

According to the disclosure, the driving mechanism of a bicycle free-coaster hub is disposed within a cavity defined by a hub axle and a hub shell. The driving mechanism comprises a driving assembly, a clutch assembly, an epicyclic gear assembly, a resisting member, a forward drag member and a reverse drag member. The driving assembly comprises a sprocket having a plurality of sprocket teeth projecting radially relative to the hub axle and a drive sleeve projecting axially from the sprocket wherein a cylindrical axle hole is defined by the sprocket and the drive sleeve for being passed through both by the hub axle. The clutch assembly includes an output clutch unit disposed on the cavity of the hub and an input clutch unit coupled with the drive sleeve to form a clutching or engaging state with the output clutch unit. The epicyclic gear assembly includes a sun gear, a ring gear, a planet gear carrier and a plurality of planet gears. The sun gear includes a disk coupled with the input clutch unit, a gear portion extending axially from the disk and a first through hole defined by the disk and the gear portion for being passed therethrough by the hub axle. The ring gear is mounted on an inner wall of the hub shell. The planet gear carrier includes an annular body defined a second through hole for being passed therethrough by the hub axle and a plurality of planet gear arms fixed to the annular body at intervals. Each of planetary gears is connected to each of the planetary gear arms and engaged respectively with the ring gear and the gear portion of the sun gear. The resisting member is disposed between the sun gear and the hub axle to apply resistance to the rotation of the sun gear. The forward drag member is disposed between the ring gear and the sun gear to apply drag to the sun gear when the hub rotates forward. The reverse drag member is disposed between the planet gear carrier and the hub axel to apply drag to the planet gear carrier when the hub rotates in reverse.

One of the specific features of one of the embodiments of the disclosure is that the output clutch unit includes a hub shell liner mounted on the inner wall of the hub shell and having an engaged surface facing to the hub axle and the input clutch unit includes a plurality of cams, a first cam receiver, a second cam receiver and a first retaining unit. Each of the cams has a first portion, a second portion, an inner surface and a roughened outer surface. The first cam receiver includes a plurality of receiving rooms integrally and angularly disposed on the drive sleeve. Each of the receiving rooms includes a first ramp and a second ramp arranged symmetrically with the first ramp. Each of the ramps has a first top portion with a first radial distance to the axis of the hub axle and a first bottom portion with a second radial distance to the axis of the hub axle wherein the first radial distance is greater than the second radial distance. The first portion of each of the cams is received respectively in each of the receiving rooms of the first ramp or the second ramp in a way that each of the cams can slide along the first ramp or the second ramp from the bottom portion to the top portion or the top portion to the bottom portion to enable the roughened outer surface of each of the cams to engage or disengage the engaged surface of the hub shell liner. The second cam receiver includes a plurality of pockets disposed on the disk of the sun gear for receiving the second portion of each of the cams so that each of the cams is constrained to the sun gear. The first retaining unit includes a retaining device and a coil-spring wherein the retaining device is received in one of the receiving rooms and in contact with the first or second ramps thereof and the coil-spring has one end inserted into the retaining device and a coil body encircled on the outer surface of each of the cams and the retaining piece respectively so that each of the cams can be moved stably along the first or second ramps of each of the receiving rooms.

Another of the specific features of one of the embodiments of the disclosure is that the output clutch unit includes a hub shell liner mounted on an inner wall of the hub shell and having an engaged surface facing to the hub axle wherein the engaged surface includes a plurality of ratchet teeth and a plurality of inclined surfaces, each of the inclined surfaces being arranged between two adjacent ratchet teeth and the input clutch unit includes a plurality of pawls, a first pawl receiver, a second pawl receiver and a second retaining unit. Each of the pawls has a first portion and a second portion. The first pawl receiver includes a plurality of pawl receiving rooms integrally and angularly disposed on the periphery of the drive sleeve. The first portion of each of the pawls is received in the pawl receiving room so that each of the pawls can move with the drive sleeve. The second pawl receiver includes a plurality of holding rooms disposed on the disk of the sun gear for housing the second portion of each of the pawls. The second retaining unit is connected with each of the pawls to retain it in a first position where it not engaged with the engaged surface of the hub shell liner. Each of the holding rooms has a raised portion so that when the sun gear moves forward, the raised portion will exert an outward thrust to push each of the pawls to a second position to engage with the ratchet teeth of the engaged surface of the hub shell liner.

Yet another of the specific features of one of the embodiments of the disclosure is that the output clutch unit includes a hub shell liner mounted on an inner wall of the cavity of the hub shell and having an inner cone surface facing to the hub axle and the input clutch unit includes a first clutch member, a second clutch member and a connecting member. The first clutch member includes a clutch portion and a sleeve portion extending axially from one end of the clutch portion. The second clutch member includes an external threaded portion disposed on the drive sleeve. The clutch portion of the clutch device includes a threaded hole for engagement with the external threaded portion so that the clutch device can be driven by the drive sleeve to axially move along the hub axle and an outer cone surface for cooperating with the inner cone surface of the hub shell liner to form a clutching or engaging state. The sleeve portion has a through hole communicated with the threaded hole of the clutch portion so that the hub axle can pass through the first clutch device. The connecting member includes a plurality of first engaging devices disposed on the sleeve portion of the clutch device and a plurality of second engaging devices disposed on the disk of the sun gear to engage with the first engaging devices so that the clutch device can move linearly relative to the sun gear or rotate with the sun gear.

BRIEF DESCRIPTION OF THE DRAWINGS

Other features and advantages of the disclosure will become readily apparent to those skilled in the art from the following detailed description of the embodiments in the light of the accompanying drawings, in which.

DETAILED DESCRIPTION

Figure 1:
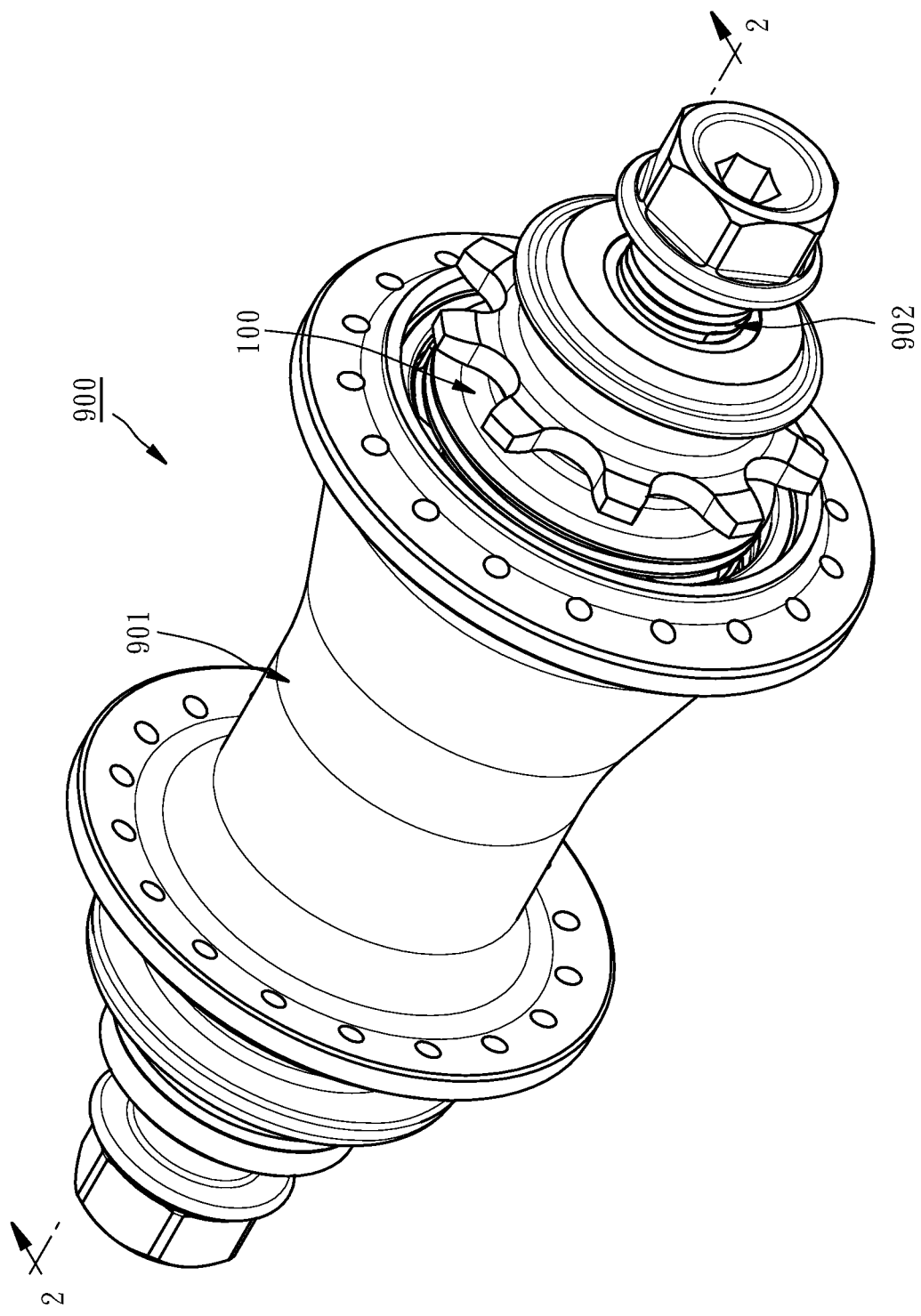
FIG. 1 is a perspective view of a bicycle free-coaster hub disposed with a first embodiment of the disclosed driving mechanism.
Figure 2:
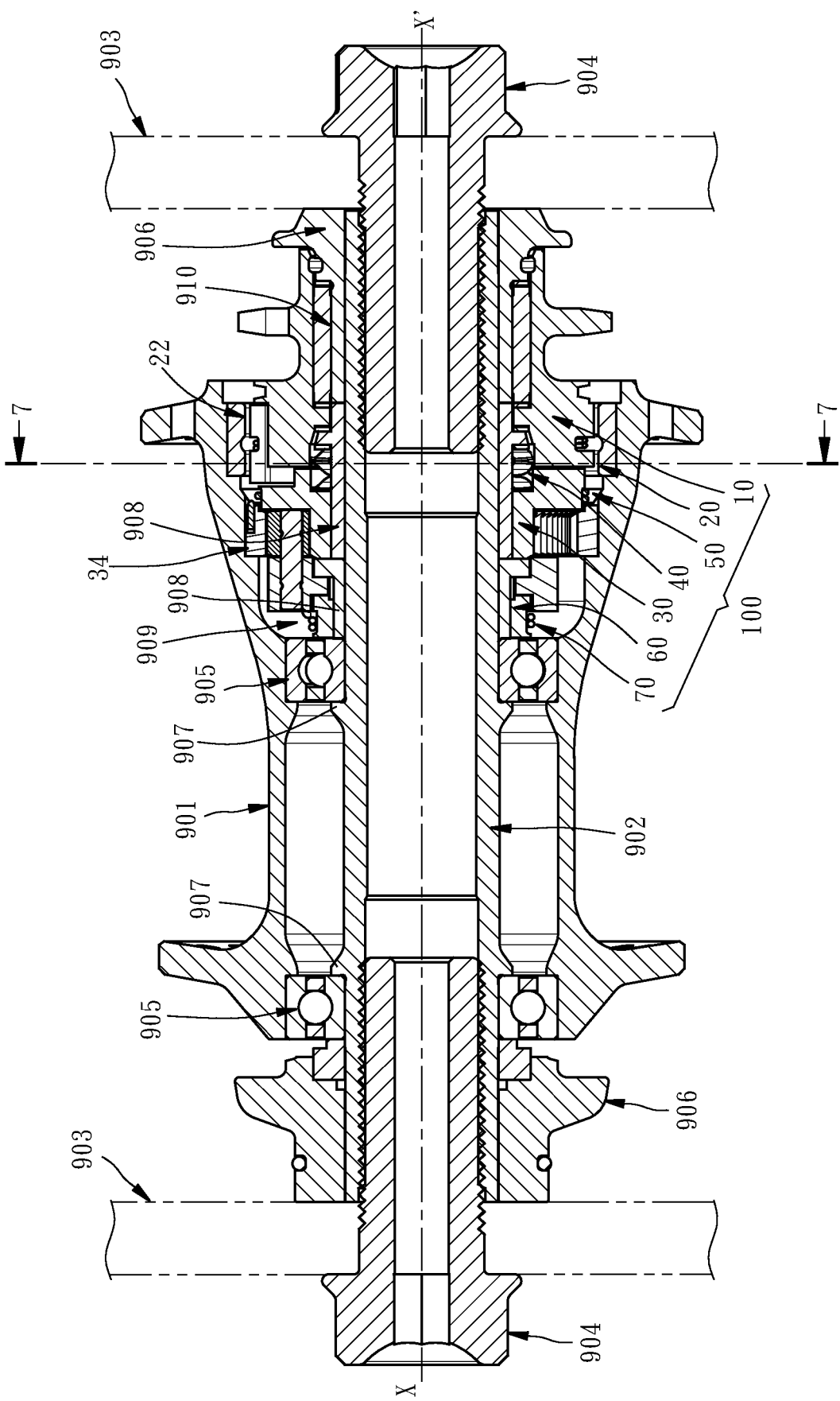
FIG. 2 is a cross-sectional view taken along the direction 2-2 of FIG. 1.

Reference will now be made in detail to the exemplary embodiments of the present disclosure, which are illustrated in the accompanying drawings. Therefore, it is to be understood that the following is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts. It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments.

Referring firstly to FIG. 1 to FIG. 7, reference number 900 shows a bicycle free-coaster hub disposed with a driving mechanism 100 of a first embodiment of the disclosure. The hub 900 includes a hub shell 901 and a hub axle 902. The hub shell 901 is mounted on two bicycle frame elements 903, as shown by the dotted line in FIG. 2, by two hub bolts 904. Each of the hub bolts 904 thread directly into the hub axle 902 such that two main-bearings 905 and a protective cover mechanism 906 are constrained to the shoulders 907 of the hub axle 902 by a plurality of hub sleeves 908. Thus, the hub shell 901 is able to rotate smoothly about an axis X-X' of the hub axle 902. The hub 900 further has a cavity 909 defined by the hub shell 901 and the hub axle 902. The driving mechanism 100 is disposed within the cavity 909.

The driving mechanism 100 comprises a driving assembly 10, a clutch assembly 20, an epicyclic gear assembly 30, a resisting member 40, a forward drag member 50 and a reverse drag member 70. The driving assembly 10 comprises a sprocket 12 and a drive sleeve 14. The sprocket 12 includes a plurality of sprocket teeth 120 projecting radially relative to the hub axle 902. The drive sleeve 14 projects axially from the sprocket 12 and has a cylindrical axle hole 122 defined by the sprocket 12 and the drive sleeve 14. The hub axle 902 passes through the axle hole 122 via a driver-bearing 910 so that the driving assembly 10 is rotated around the hub axle 902.

The clutch assembly 20 includes an output clutch unit 22 disposed on the cavity 909 of the hub 900 and an input clutch unit 24 coupled with the drive sleeve 14 to form a clutching or engaging state with the output clutch unit 22. The epicyclic gear assembly 30 includes a sun gear 32 having a disk 320 and a gear portion 322 extending axially from the disk 320, a ring gear 34, a plurality of planet gears 36 and a planet gear carrier 38.

Figure 3:
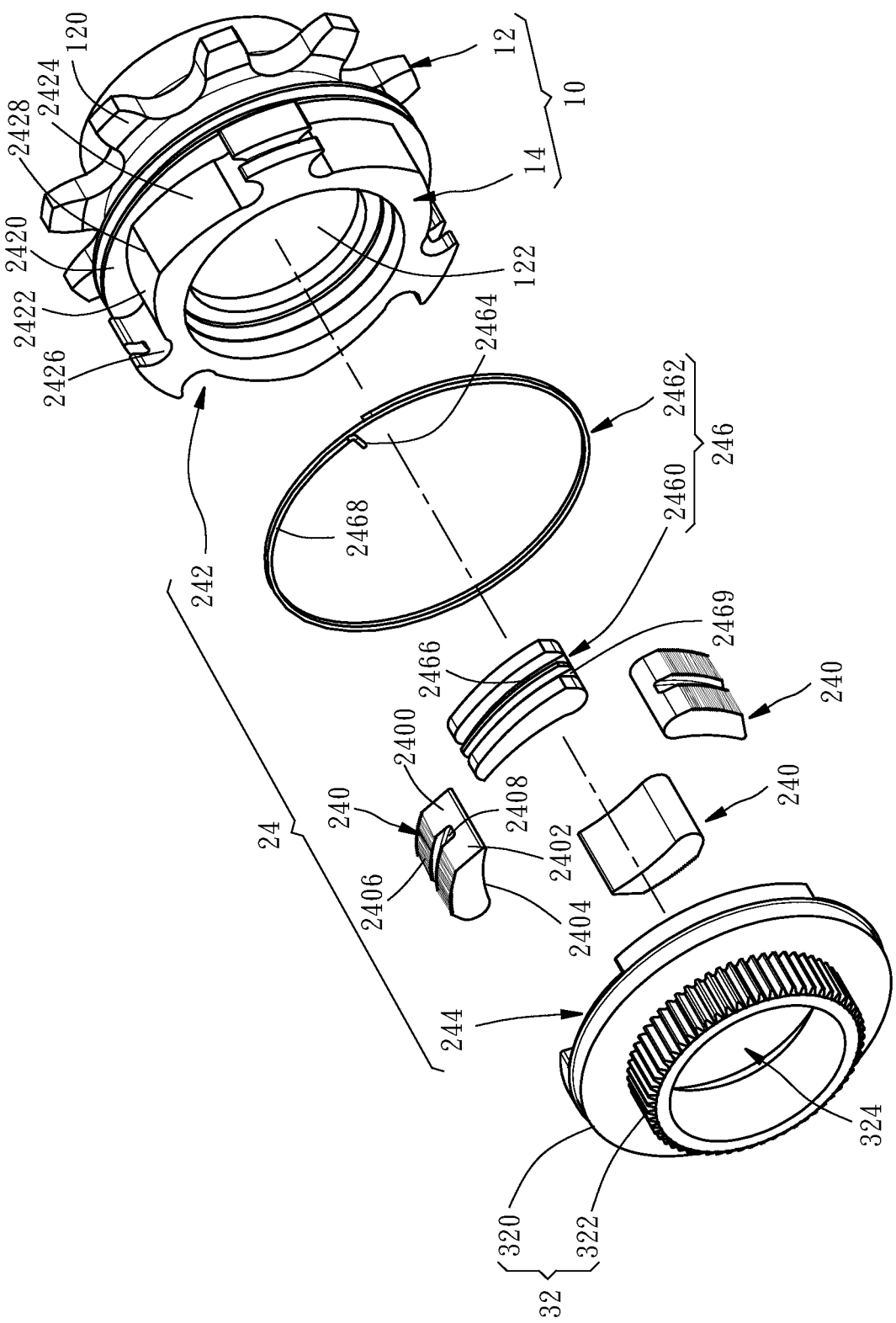
FIG. 3 is an exploded perspective view of the driving assembly and the input clutch unit of the first embodiment of the disclosed driving mechanism shown in FIG. 1.
Figure 4:
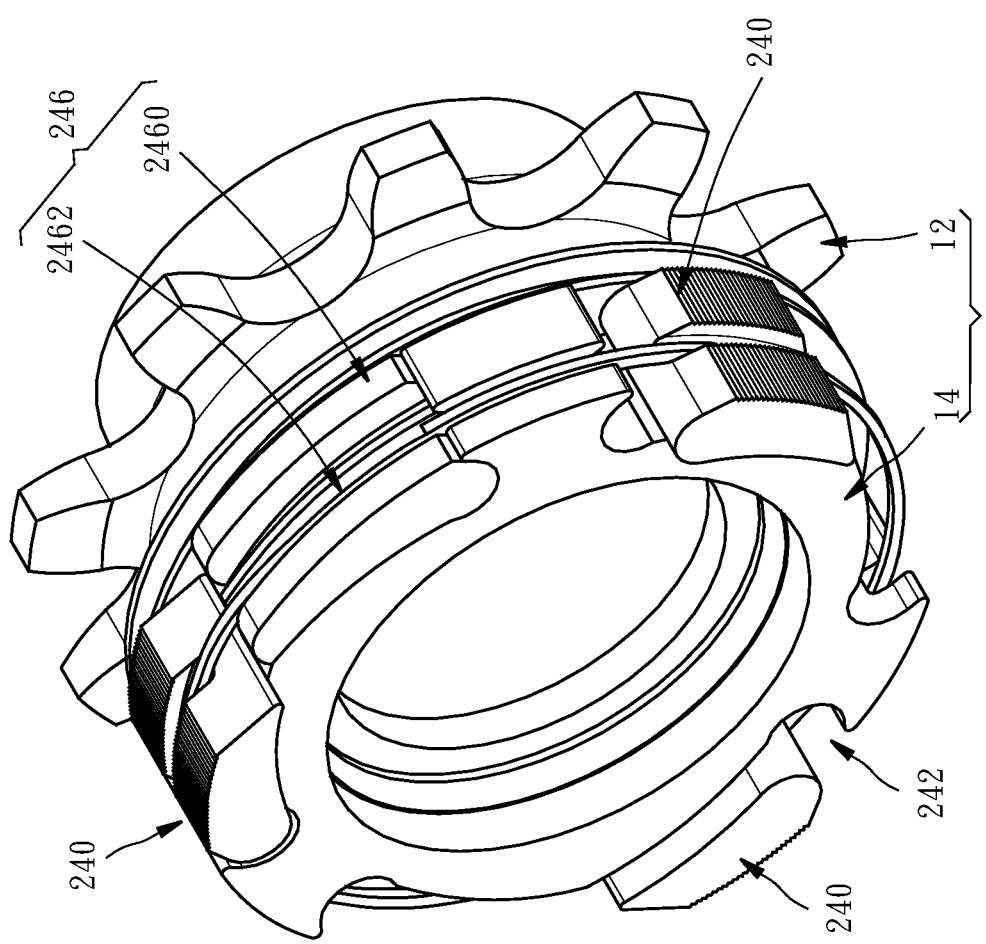
FIG. 4 is a combined perspective view of the driving assembly and the input clutch unit shown in FIG. 3.
Figure 7:
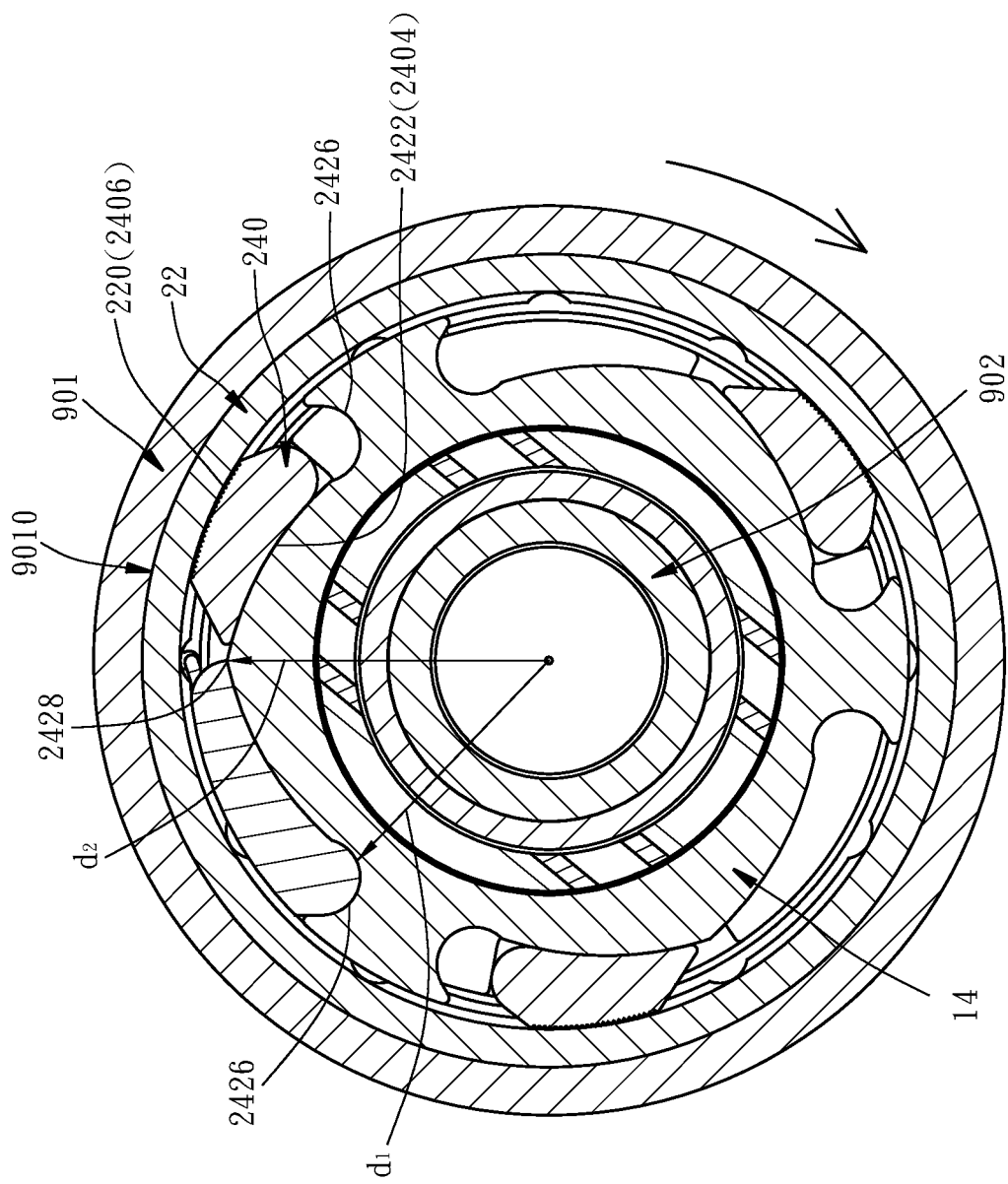
FIG. 7 is a cross-sectional view taken along the direction 7-7 of FIG. 2.
Figure 8:
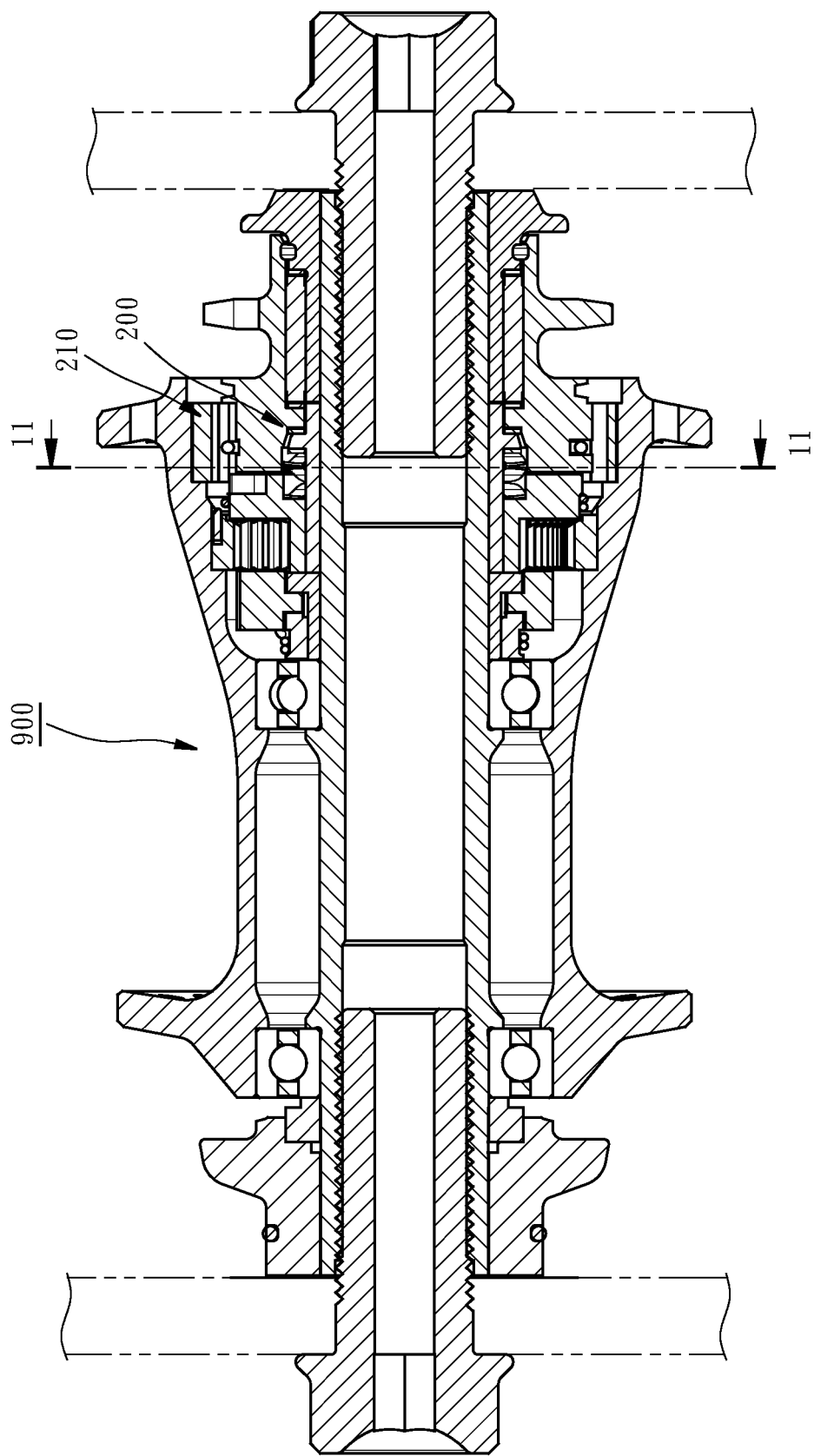
FIG. 8 is a cross-sectional view of a second embodiment of the disclosed driving mechanism wherein the cross-sectional direction is the same as that of FIG. 2 of the first embodiment.
Figure 9:
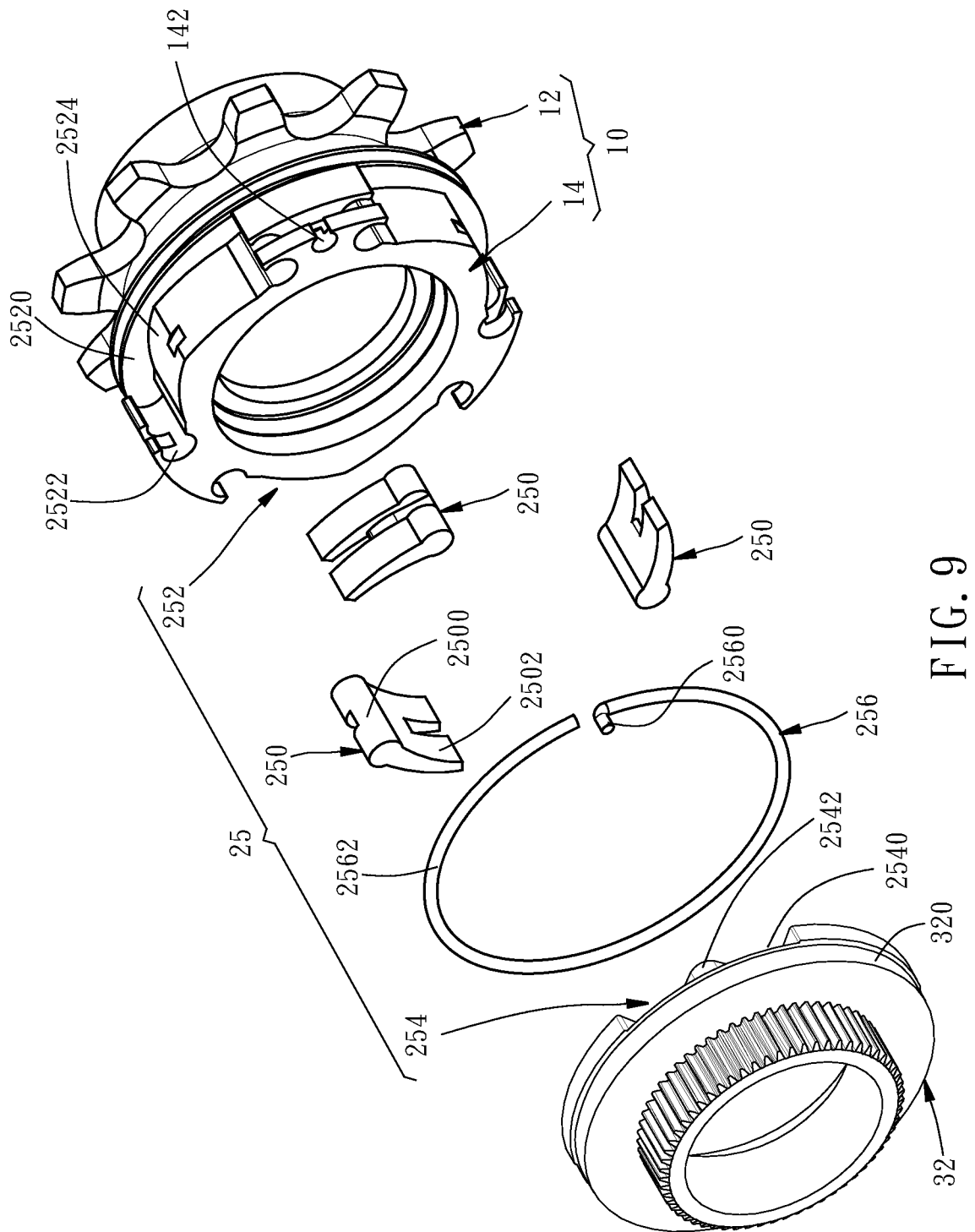
FIG. 9 is an exploded perspective view of the driving assembly and the input clutch unit of the second embodiment of the disclosed driving mechanism shown in FIG. 8.
Figure 10:
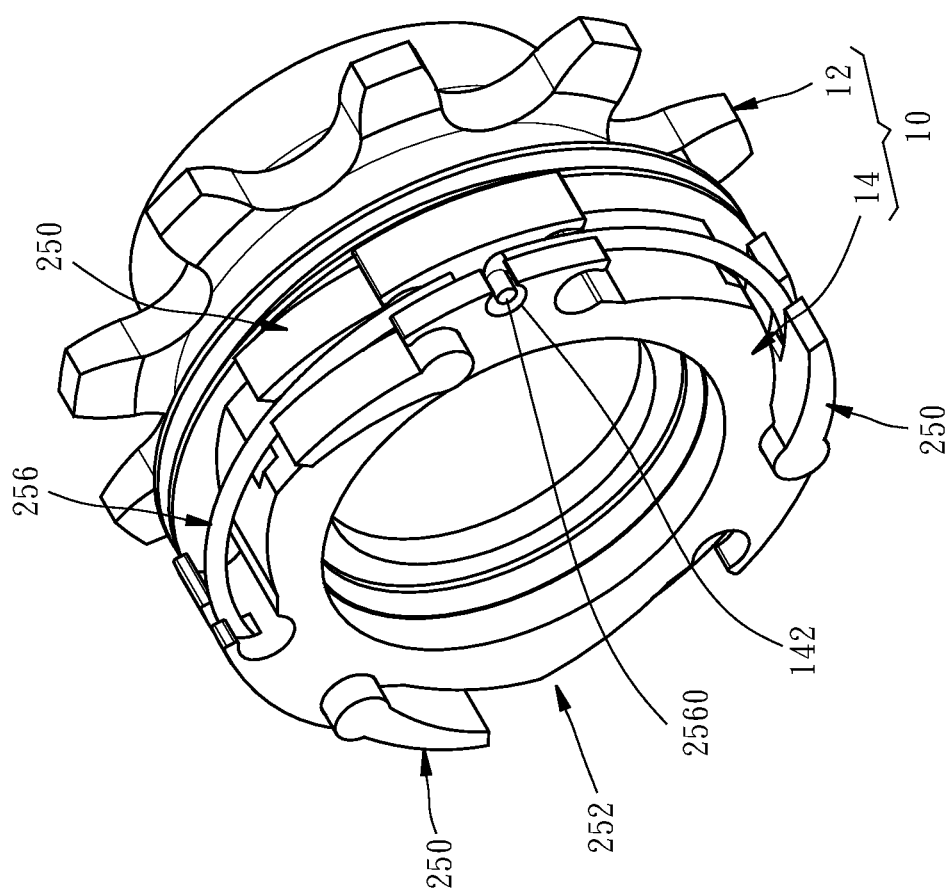
FIG. 10 is a combined perspective view of the driving assembly and the input clutch unit shown in FIG. 9.

In this embodiment, the output clutch unit 22 is a hub shell liner mounted on the inner wall 9010 of the hub shell 901 and having an engaged surface 220, as shown in FIG. 7, facing to the hub axle 902. The input clutch unit 24, as shown in FIG. 3, includes a plurality of cams 240, a first cam receiver 242, a second cam receiver 244 and a first retaining unit 246. Each of the cams 240 has a first portion 2400, a second portion 2402, a concave arc inner surface 2404 and a roughened outer surface 2406. The first cam receiver 242, in this embodiment, includes a plurality of receiving rooms 2420 integrally and angularly arranged about the periphery of the drive sleeve 14. Each of the receiving rooms 2420 includes a first ramp 2422 and a second ramp 2424 arranged symmetrically with the first ramp 2422. Each of the ramps 2422, 2424 has a first bottom portion 2426 and a first top portion 2428. As shown in FIG. 7, the radial distance $d_1$ between the first bottom 2426 and the hub axle 902 is smaller than the radial distance $d_2$ between the first top portion 2428 and the hub axle 902. The first ramp 2422 and the second ramp 2424 are used to enable the drive assembly 10 to be assembled on the left or right side of the hub shell 901. The first portion 2400 of each of the cams 240 is received in each of the receiving rooms 2420 in a way that the inner surface 2404 is in contact with the first ramp 2420 in a manner that can slide along the first ramp 2422 from the bottom portion 2426 to the top portion 2428 or the top portion 2428 to the bottom portion 2426 to enable the roughened outer surface 2406 to engage or disengage the engaged surface 220 of the hub shell liner 22. The second cam receiver 244 includes a plurality of pockets 2440 disposed on the disk 320 of the sun gear 32 for receiving the second portion 2402 of each of the cams 240 so that each of the cams 240 can move with the sun gear 32. The first retaining unit 246 includes a retaining piece 2460 and a coil-spring 2462. The retaining piece 2460 is received in one of the receiving rooms 2420 and in contact with the second ramp 2424 thereof. The coil-spring 2462 has one end 2464 inserted into an inserted hole 2466 of the retaining piece 2460 and a coil body 2468 encircled on a first groove 2408 of each of the cams 240 and a second groove 2469 of the retaining piece 2460 respectively so that each of the cams 240 can be moved along the first ramp 2422 of each of the receiving rooms 2420.

In this embodiment, the disk 320 of and the gear portion 322 of the sun gear 32 defines a first axle hole 324 for being passed therethrough by the hub axle 902 to allow the sun gear 32 to rotate therearound. The ring gear 34 is mounted on the inner wall 9010 of the hub shell 901 relative to the gear portion 322 of the sun gear 32. The planet gear carrier 38 has a second axle hole 380 for being passed therethrough by the hub axle 902 to allow the planet gear carrier 38 to rotate therearound and a plurality of gear arms 382. Each of the planet gears 36 is connected to each of the gear arms 382 in a way that it can rotate around each of the gear arms 382 and is engaged respectively with the ring gear 34 and the gear portion 322 of the sun gear 32.

The resisting member 40, in this embodiment, includes a wave spring 42 and a washer 44. The wave spring 42 and the washer 64 are received in a recessed space 326 defined by the disk 320 of the sun gear 32 and a corresponding hub sleeve 908 so that the wave spring 42 is energized by the overall assembly of the hub 900 to the bicycle frames 903 by the hub bolts 904 to apply resistance to the rotation of the sun gear 32.

The forward drag member 50, in this embodiment, is a forward drag spring having a head end 52, a tail end 54 and a helical body 56. The helical body 56 encircles the disk 322 of the sun gear 32 in a forward direction from the head end 52 and the tail end 54 is inserted into an inserted hole 340 of the ring gear 34 so that the forward drag spring 50 can apply drag to the sun gear 32 when the hub 900 rotates forward.

Figure 5:
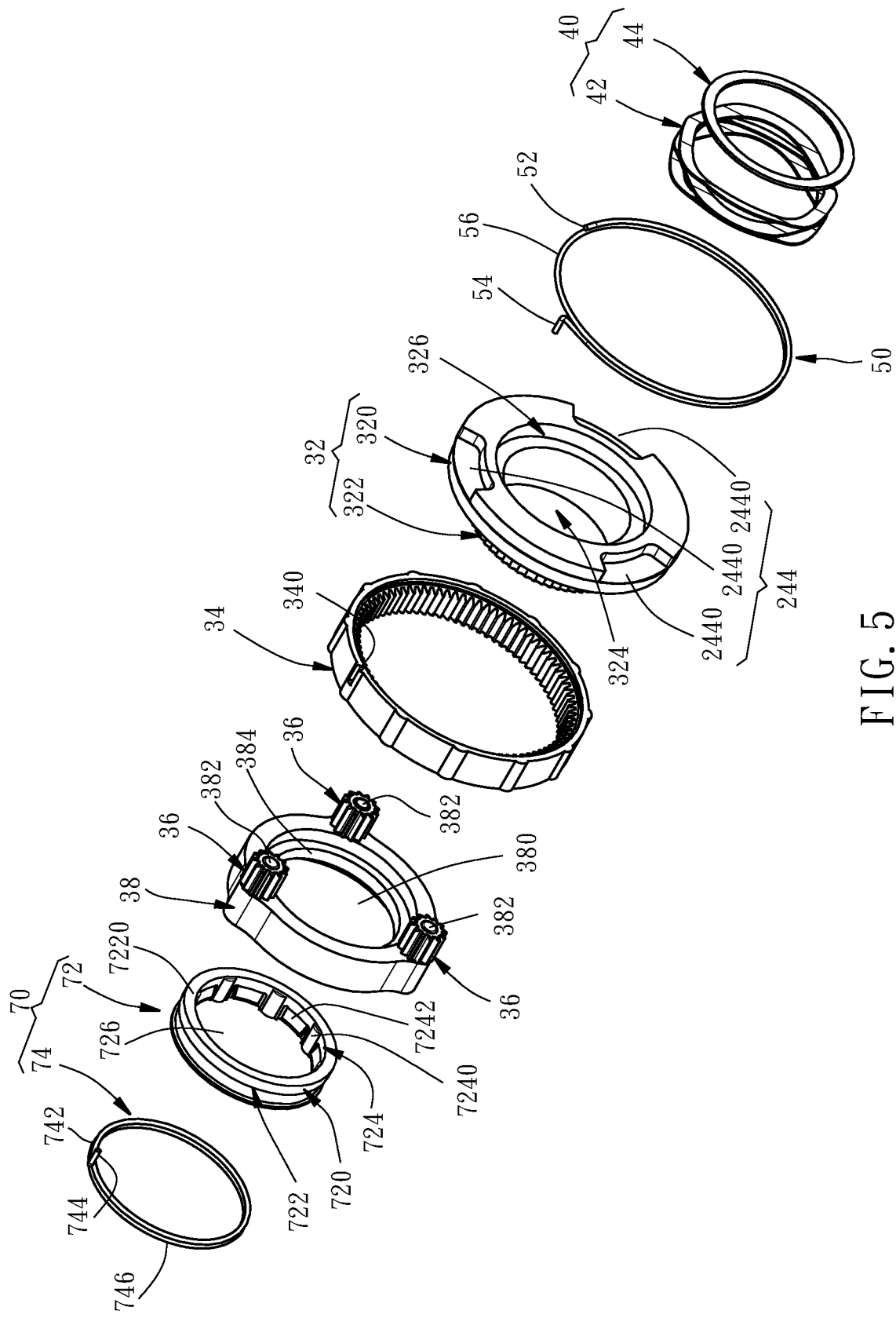
FIG. 5 is an exploded perspective view of the epicyclic gear assembly, the resisting member, the forward drag member and the reverse drag member of the first embodiment of the disclosed driving mechanism shown in FIG. 1.
Figure 6:
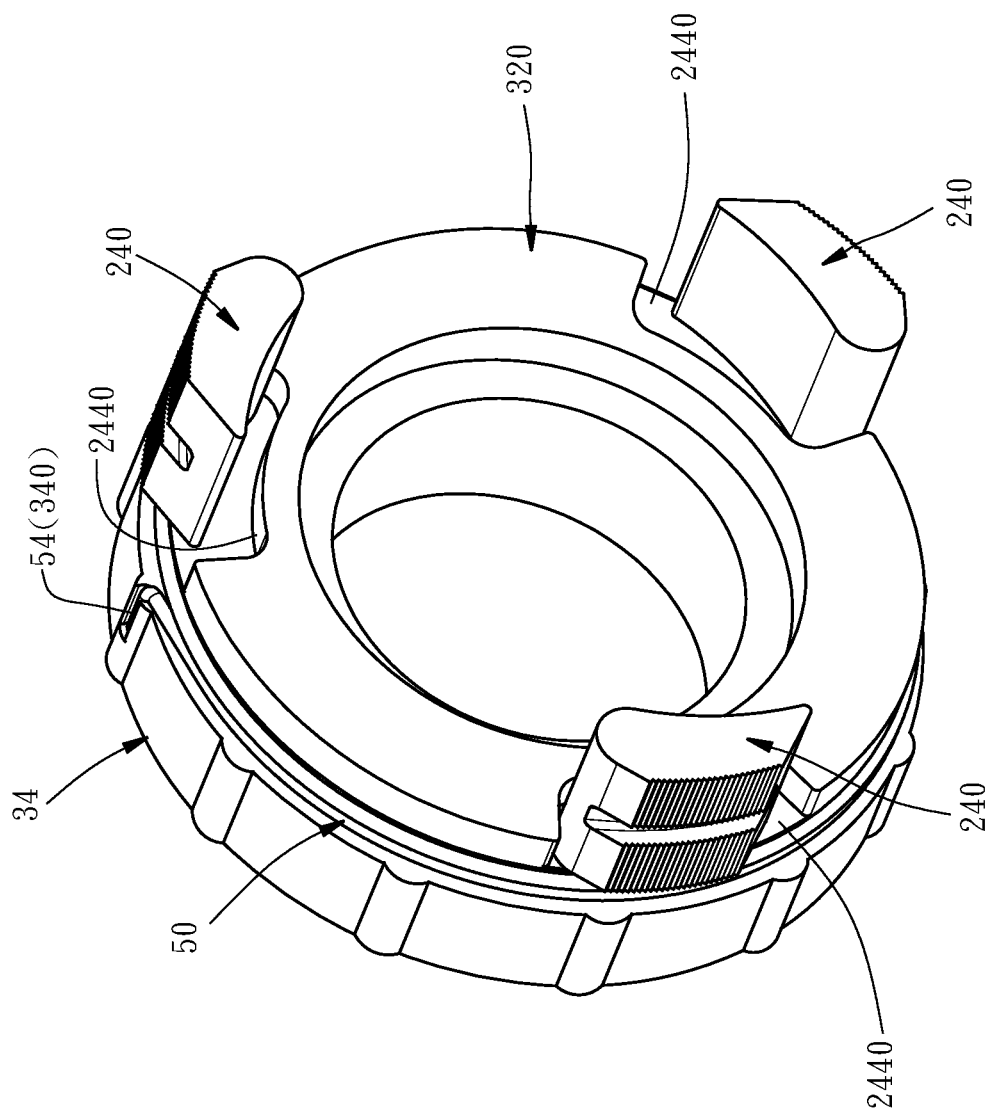
FIG. 6 is a combined perspective view of the sun gear and the ring gear, the cams and the forward drag member of the first embodiment of the disclosed driving mechanism shown in FIG. 1.

The reverse drag member 70, in this embodiment, as shown in FIG. 5, includes a locating sleeve or liner 72 and a reverse drag spring 74. The locating sleeve 72 includes an annular body 720, an outer surface 722 and an inner surface 724. The annular body 720 defines a third axle hole 726 for being passed therethrough by the hub axle 902. The outer surface 722 has a ring edge 7220 engaging with an inner wall 384 of the planet gear carrier 38 and the inner surface 724 has a plurality of protrusions 7240 and elastic clips 7242 to tightly sleeve on the hub axle 902 via another corresponding hub sleeve 908. The reverse drag spring 74 has a head end 742, a tail end 744 and a helical body 746. The helical body 746 encircles the outer surface 722 of the locating sleeve 72 in a reverse direction from the head end 742 and the tail end 744 is embedded on the planet gear carrier 38 so that the reverse drag spring 74 can apply drag to the planet gear carrier 38 when the hub rotates in reverse.

The following describes the operation of the driving mechanism 100 in detail:

When the bicycle is at rest or moving forwards: If the rider begins to pedal forwards, the chain causes the driving assembly 10 to rotate forward (clockwise as viewed in FIG. 1). The cams 240 are initially restrained from moving forward by the sun gear 32. And in turn, the sun gear 32 is restrained from movement by the friction created by the forward drag member 50. As the driving assembly 10 advances relative to the cams 26, the first ramp 2422 move against the inner surface 2404 to move the cams 240 radially outwards. As the cams 240 move radially outwards, the roughened outer surface 2406 come into contact with the engaged surface 220 of the hub shell liner 22. Such a cam action produces a high contact force and the driving mechanism 100 becomes fully engaged with the wheel such that the bicycle is driven forwards, as shown by the arrow in FIG. 7.

When the rider subsequently ceases pedaling, the cams 240 are carried forward relative to the driving assembly 10, initially by the hub shell liner 22 and then by the friction applied by the forward drag member 50 so that the cams 240 move down the first ramp 2422 and are no longer held out against the hub shell liner 22 and therefore the wheel is fully disengaged. When the cams 240 are carried forward from the top portion 2428 to the bottom portion 2426, the friction between the forward drag member 50 and the disk 320 is overwhelmed and the forward drag member 50 slips relative to the sun gear 32. At this point, the bicycle will freewheel forward.

When the bicycle coasts backwards, the hub 900 rotates backward (anticlockwise as viewed in FIG. 7). The hub shell 901, the hub shell liner 22 and the ring gear 34 move backward relative to the hub axle 902. This backward movement will attempt to turn the planet gear carrier 38 backwards but this movement will be resisted by the reverse drag member 70. The epicyclic gear assembly 30 will therefore be engaged and overwhelm the friction applied to the sung ear 32, causing the sun gear 32 to rotate forwards. At this time, the pockets 2440 will carry the cams 240 forward and further away from engagement with the hub shell liner 22. Once the cams 240 can no longer rotate forward relative to the driving assembly 10, the friction applied to the planet gear carrier 38 will be overwhelmed and it will rotate backwards to allow the sun gear 32 to remain stationary. At this point, the bicycle will coast backward. If, while coasting backwards, the rider inadvertently begins to pedal forwards, the greater friction at the planet gear carrier 38 will try to restrain the planet gear carrier 38 such that the sun gear 32 will resume rotating forwards. Again, the pockets 2440 will carry the cams 240 forward and further away from engagement with the hub shell liner 22. Thus, accidental engagement of drive will be prevented.

Figure 11:
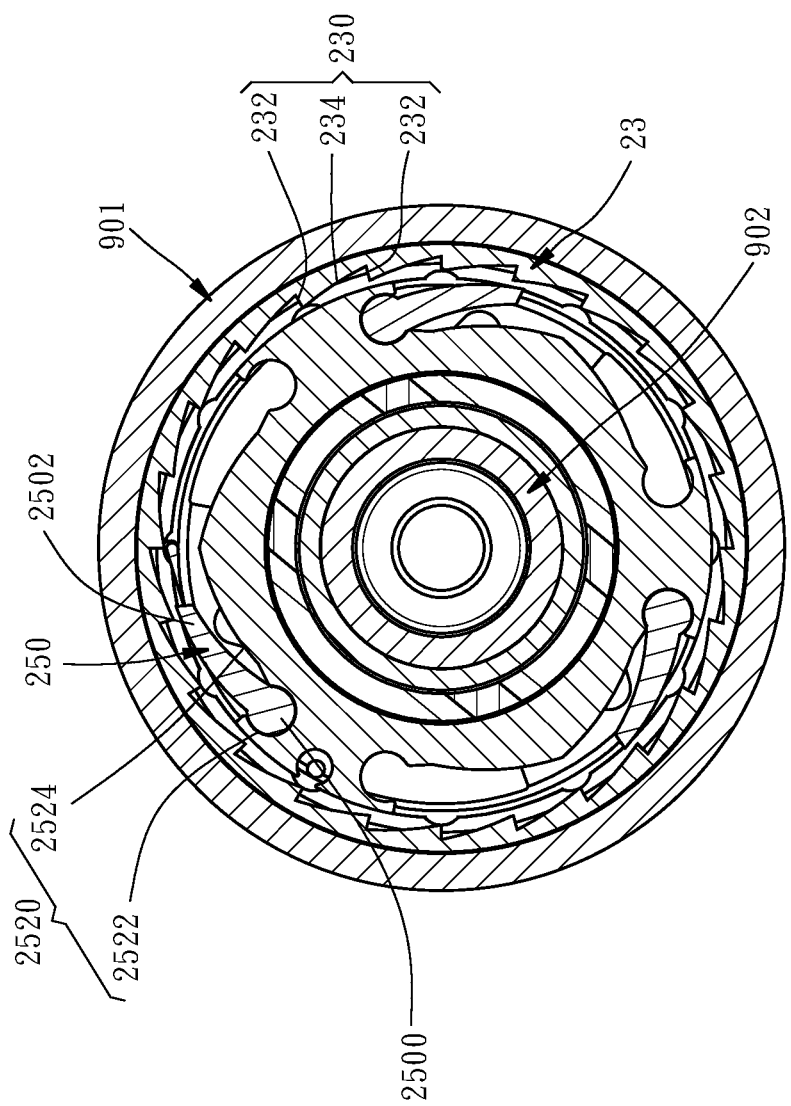
FIG. 11 is a cross-sectional view taken along the direction 11-11 of FIG. 8.
Figure 12:
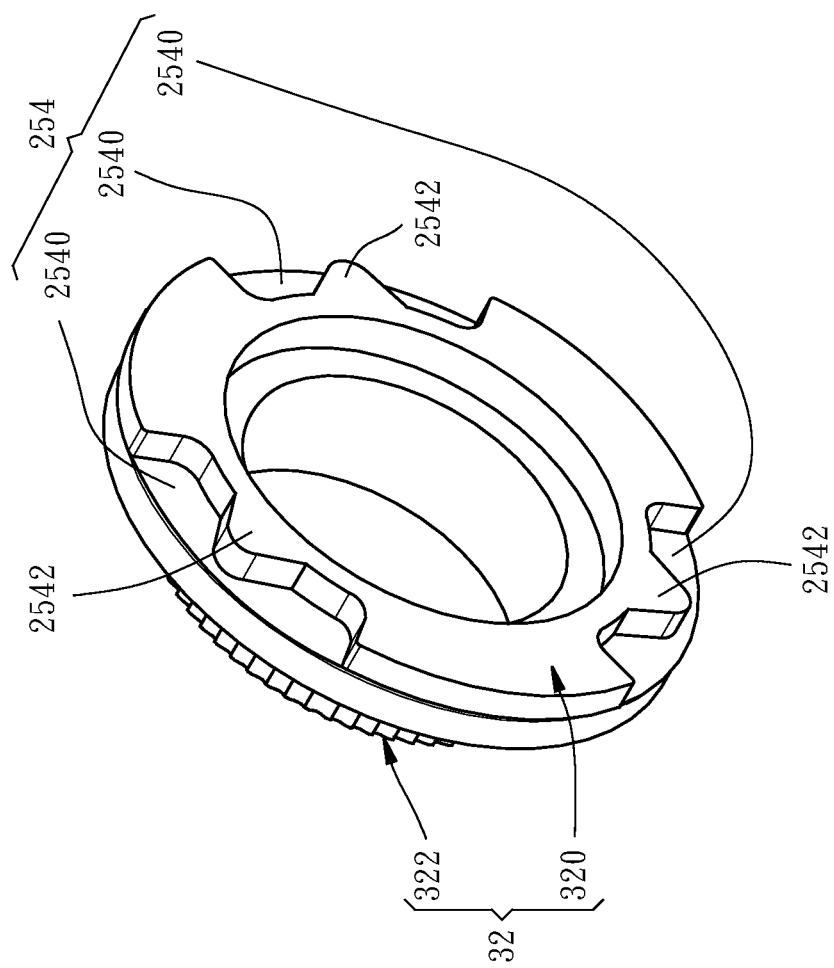
FIG. 12 is a perspective view of the sun gear of the epicyclic gear assembly of the second embodiment of the disclosed driving mechanism shown in FIG. 8.
Figure 13:
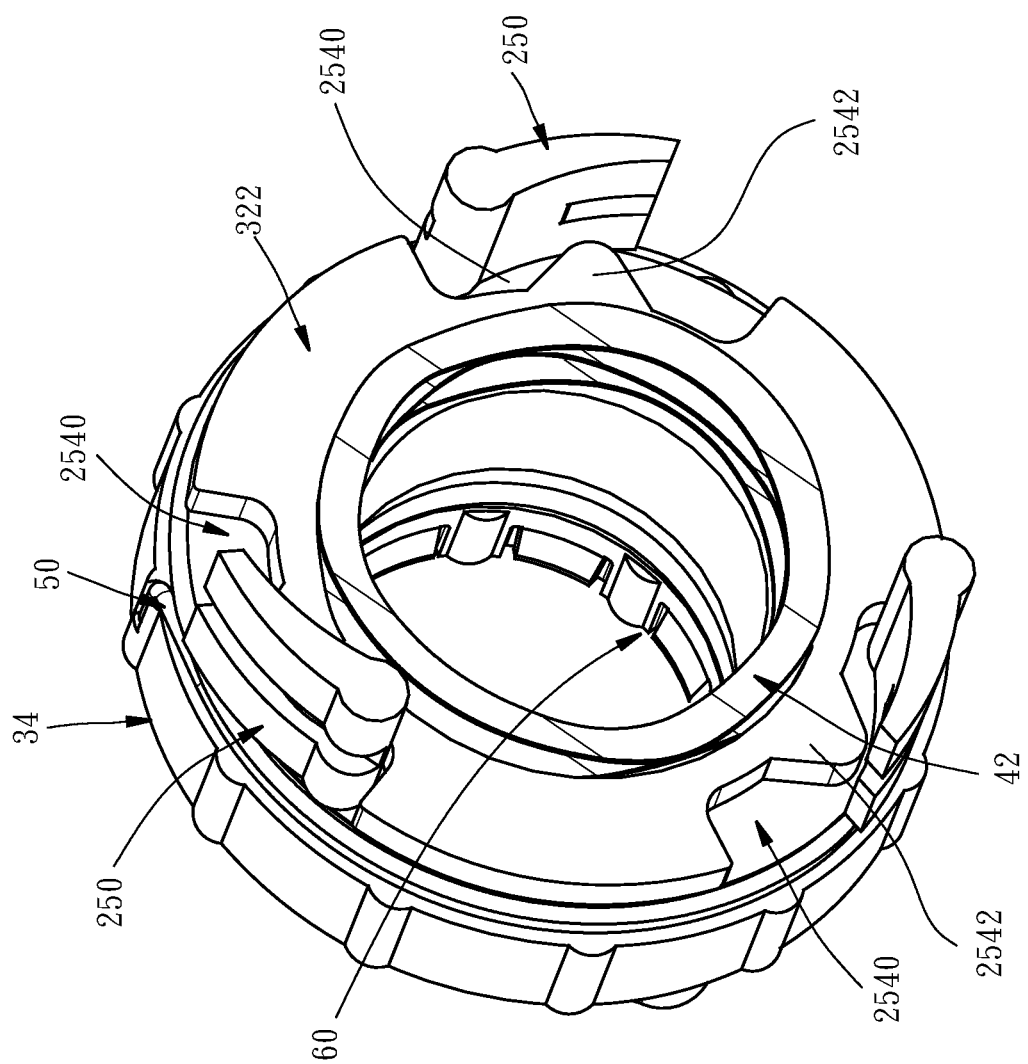
FIG. 13 is a combined perspective view of the sun gear and the ring gear of the epicyclic gear assembly, the pawls of the input clutch unit and the forward drag member of the second embodiment of the disclosed driving mechanism shown in FIG. 8.

Next, referring to FIG. 8 to FIG. 13, these drawings show that the bicycle free-coaster hub 900 is disposed with a driving mechanism 200 of a second embodiment of the disclosure. It must be mentioned here that in the following description of the driving mechanism 200, the same reference numbers are used for the same components as those of the driving mechanism 100. The differences between the driving mechanism 200 and the driving mechanism 100 are as follows:

the driving mechanism 200 includes a clutch assembly 21 having an output clutch unit 23 and an input clutch unit 25. The output clutch unit 23, in this embodiment, is also a hub shell liner having an engaged surface 230 with a plurality of ratchet teeth 232 and an inclined surface 234 between two adjacent ratchet teeth 232, as shown in FIG. 11. the input clutch unit 25 includes a plurality of pawls 250, a first pawl receiver 252, a second pawl receiver 254 and a second retaining unit 256. Each of the pawls 250 includes a cylindrical root 2500 and a claw body 2502 extending outward from the cylindrical root 2500. In this embodiment, the first pawl receiver 252 includes a plurality of pawl receiving rooms 2520 integrally and angularly arranged about the periphery of the drive sleeve 14. Each of the pawl receiving rooms 2520 has an arc-shaped concave base 2522 and a ramp surface 2524 extending outward from the arc-shaped concave base 2522. The second pawl receiver 254 includes a plurality of holding rooms 2540 integrally and angularly arranged on the disk 320 of the sun gear 32. In combination, a part of the cylindrical root 2500 is held in the arc-shaped concave base 2522 and a part of the claw body 2502 extends along a ramp surface 2524 so that each of the pawls 250 can swing between a first position and a second position. Another part of the cylindrical root 2500 and another part of the claw body 2502 are housed in the holding room 2540. Furthermore, each of the holding rooms 2540 has a raised portion 2542 so that when the sun gear 32 moves forward, the raised portion 2542 will exert an outward thrust to push each of the pawls 250 from the first position to the second position to engage with the ratchet teeth 232 of the engaged surface 230 of the hub shell liner 23. The second retaining unit 256 is a coil-spring having one end 2560 inserted into an insert hole 142 of the drive sleeve 14 and a coil body 2562 encircled on the outer surface of each of the pawls 250 to retain each of the pawls 250 in the first position.

Figure 14:
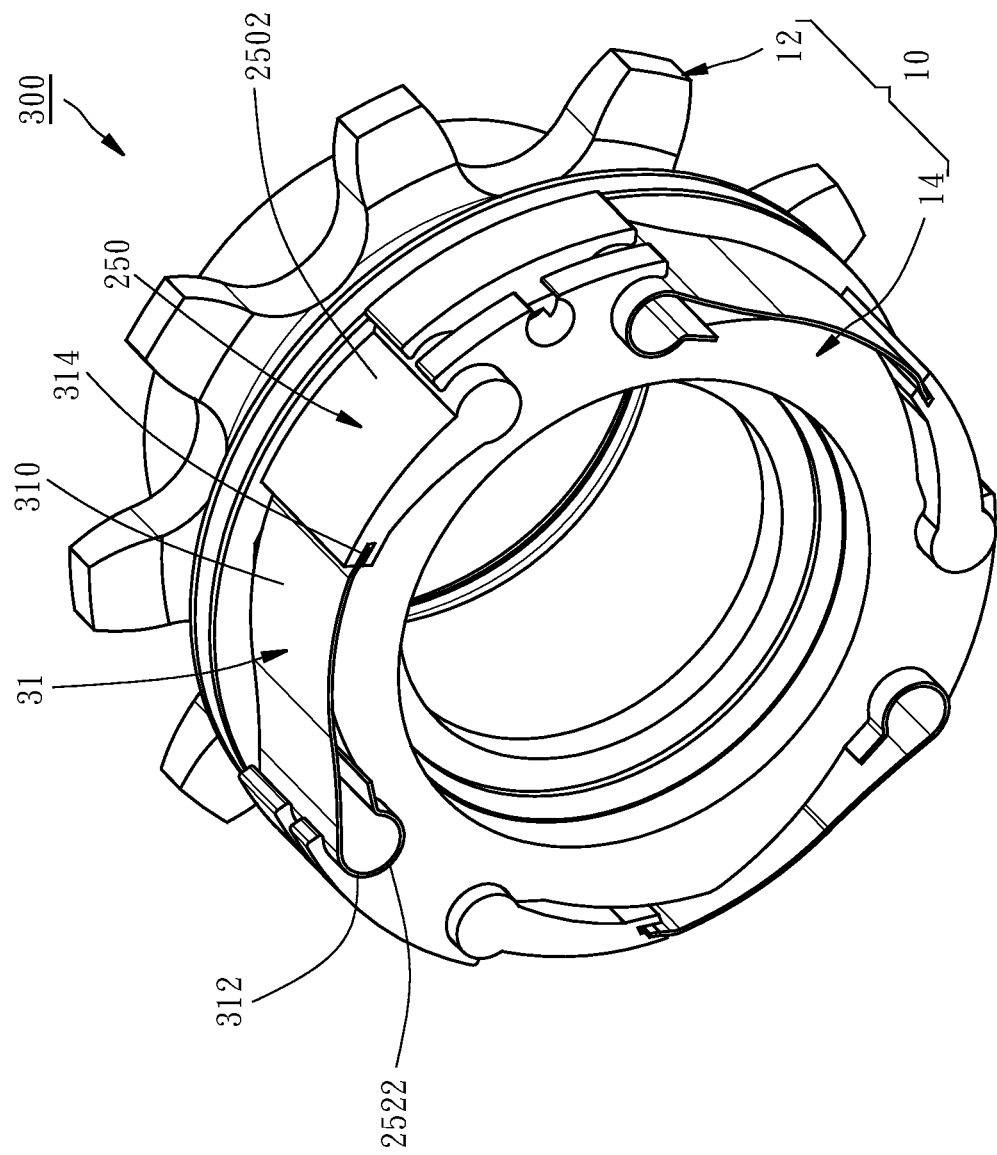
FIG. 14 is a combined perspective view of the driving assembly and the input clutch unit of a third embodiment of the disclosed driving mechanism.

FIG. 14 shows a combined perspective view of the driving assembly and the driven clutch unit of a driving mechanism 300 of a third embodiment of the disclosure. The driving mechanism 300 differs from the driving mechanism 200 in that it includes a third retaining unit 31 having a plurality of sheet-like springs 310. Each of the sheet-like springs 310 has a proximal end 312 fixed on arc-shaped concave base 2522 of the pawl receiving room 2520 and a distal end 314 connected with the claw body 2502 of each of the pawls 250 to retain each of the pawls 250 in the first position.

Figure 15:
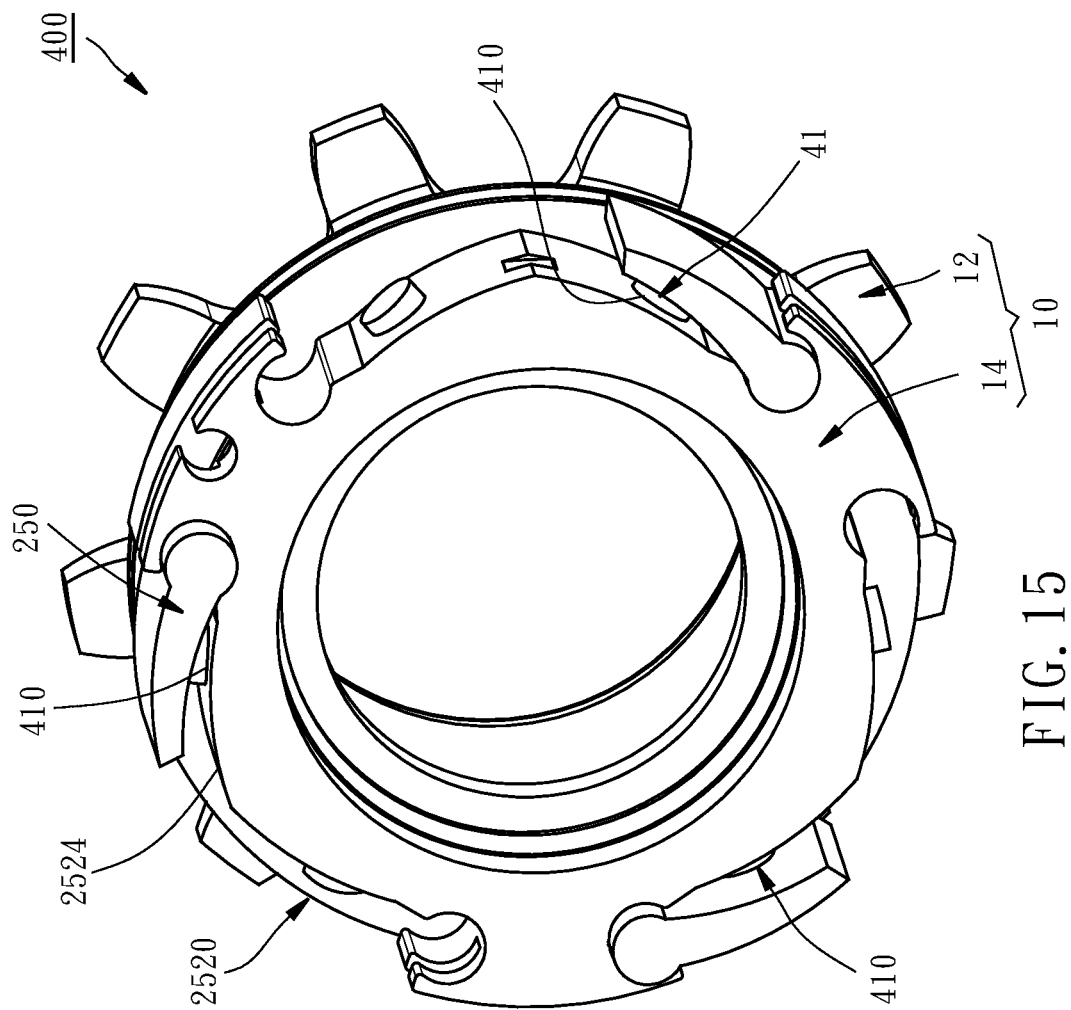
FIG. 15 is a combined perspective view of the driving assembly and the input clutch unit of a fourth embodiment of the disclosed driving mechanism.

FIG. 15 shows a combined perspective view of the driving assembly and the driven clutch unit of a driving mechanism 400 of a fourth embodiment of the disclosure. The driving mechanism 400 differs from the driving mechanism 200 in that when the pawls 250 are made of metal materials, the driving mechanism 400 includes a fourth retaining unit 41 having a plurality of magnetic members 410. Each of the magnetic members 410 is embedded in the ramp surface 2524 of each of the pawl receiving rooms 2520 to retain each of the pawls 250 in the first position by its magnetic force.

Figure 16:
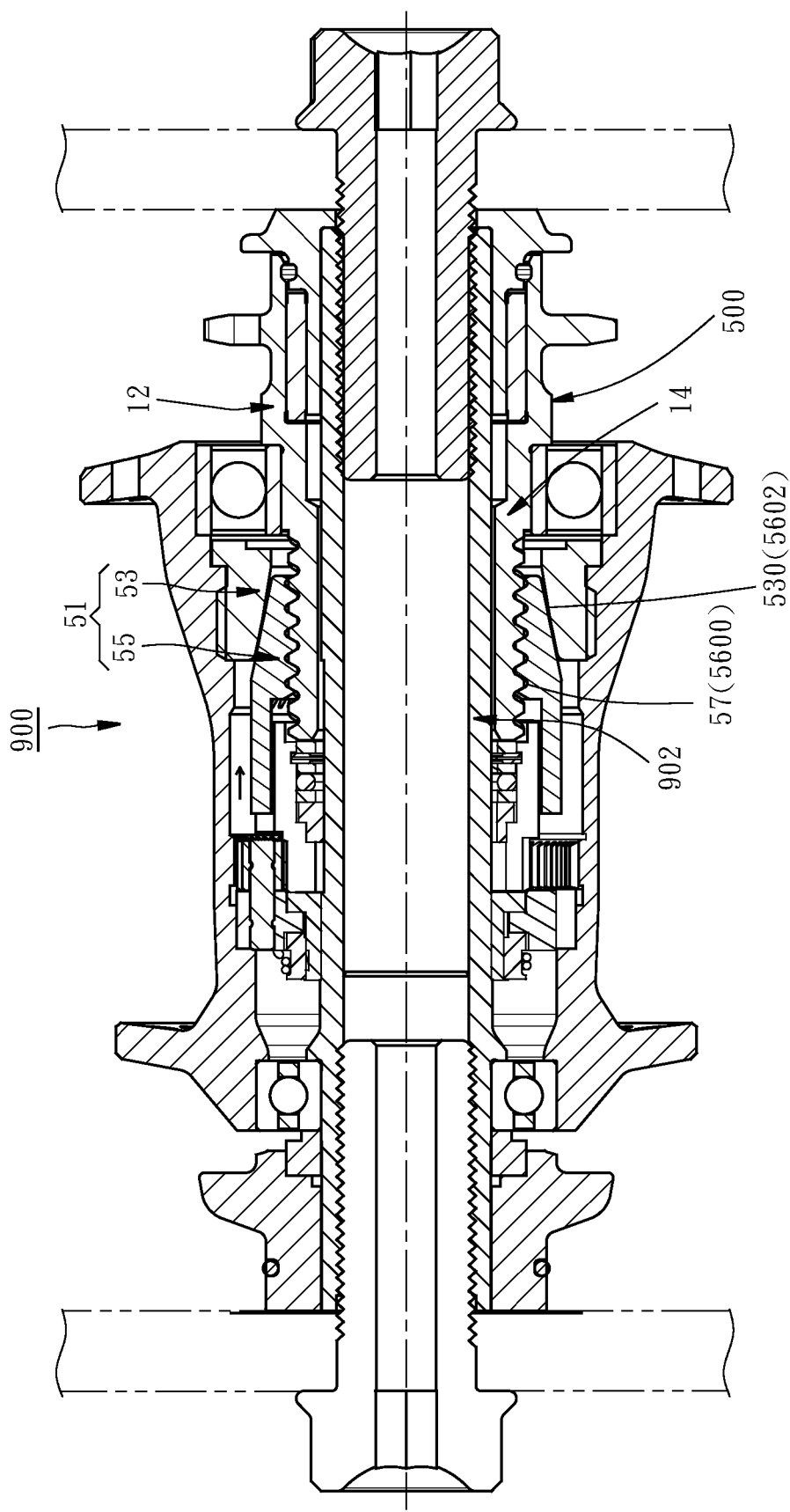
FIG. 16 is a partial cross-sectional view of a fifth embodiment of the disclosed driving mechanism wherein the cross-sectional direction is the same as that of FIG. 2 of the first embodiment.
Figure 17:
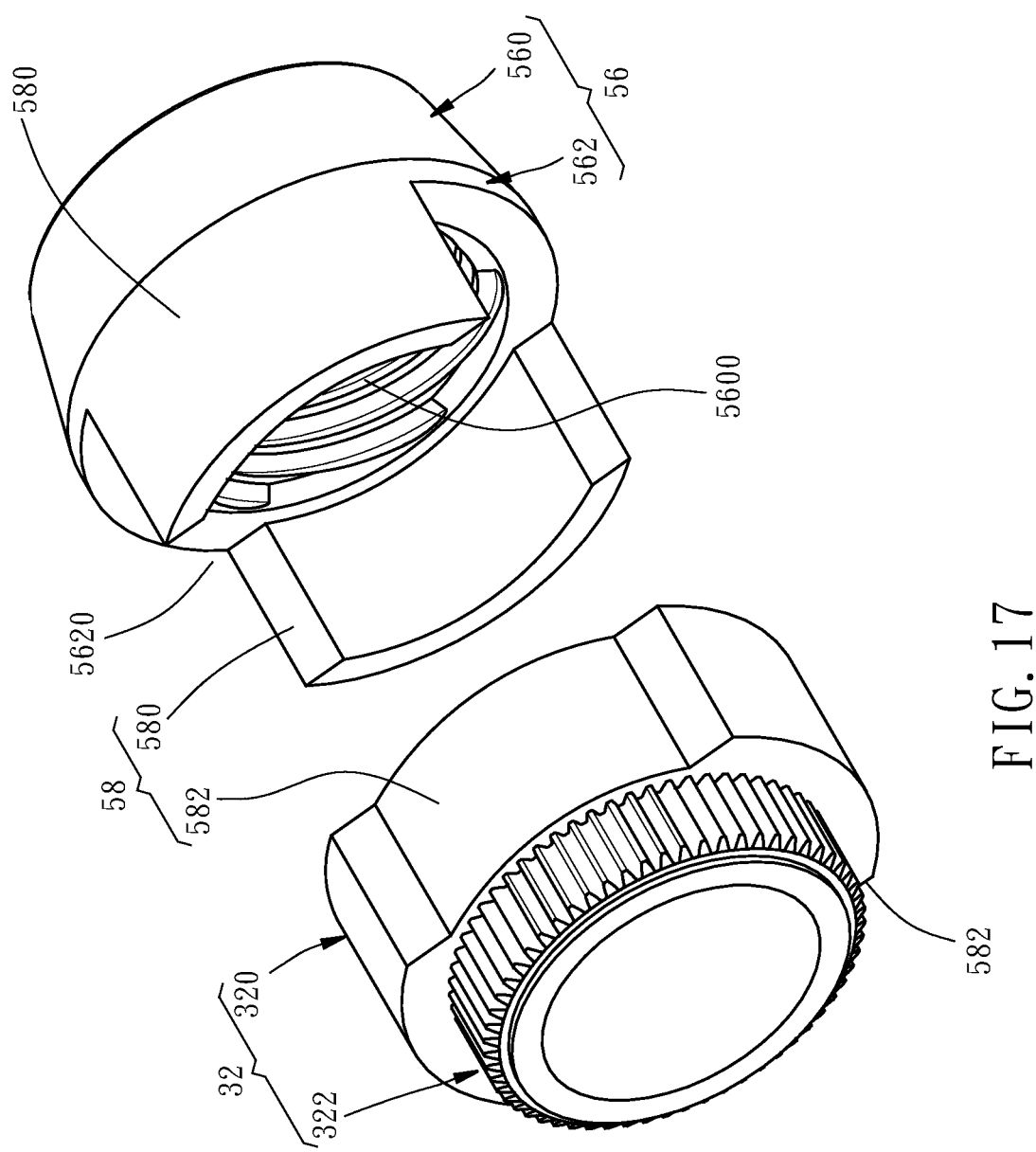
FIG. 17 is an exploded perspective view of the clutch device and the sun gear of the fifth embodiment of the disclosed driving mechanism shown in FIG. 16.

Lastly, referring to FIG. 16 and FIG. 17, the drawings show that the bicycle free-coaster hub 900 is disposed with a driving mechanism 500 according to a fifth embodiment of the disclosure. The driving mechanism 500 differs from the driving mechanism 100 in that the driving mechanism 500 includes a clutch assembly 51 having an output clutch unit 53 and an input clutch unit 55. The output clutch unit 53, in this embodiment, is also a hub shell liner having an inner cone surface 530 facing to the hub axle 902. The input clutch unit 55 has a first clutch member 56, a second clutch member 57 and a connecting member 58. The first clutch member 56 includes a clutch portion 560 and a sleeve portion 562 extending axially from one end of the clutch portion 560. The second clutch member 57 is an external threaded portion disposed on the drive sleeve 14. The clutch portion 560 has a threaded hole 5600 for engagement with the second clutch member 57 so that the first clutch member 56 can be driven by the drive sleeve 14 to axially move along the hub axle 902 and an outer cone surface 5602 for cooperating with the inner conical surface 530 of the output clutch unit 53 to form a clutching or engaging state. The sleeve portion 562 has a through hole 5620 communicated with the threaded hole 5600 of the clutch portion 560 so that the hub axle 902 can pass through the input clutch unit 55. In this embodiment, the connecting member 58 includes two first engaging devices 580 symmetrically disposed on the sleeve portion 562 and two second engaging devices 582 symmetrically disposed on the disk 320 of the sun gear 32 to engage with the first engaging devices 580 so that the input clutch unit 55 can move linearly relative to the sun gear 32 or rotate with the sun gear 32.

What is claimed is:

1. A driving mechanism of a bicycle free-coaster hub, the hub including a hub axle and a hub shell disposed coaxially about the hub axle, the driving mechanism disposed within a cavity defined by the hub axle and the hub shell, the driving mechanism comprising:
a driving assembly comprising a sprocket having a plurality of sprocket teeth projecting radially relative to the hub axle, a drive sleeve projecting axially from the sprocket and a central cylindrical axle opening defined by the sprocket and the drive sleeve for being passed therethrough by the hub axle;
a clutch assembly including an output clutch unit disposed on the cavity of the hub shell and an input clutch unit coupled to the drive sleeve to form a clutching or engaging state with the output clutch unit;
an epicyclic gear assembly including:
a sun gear having a disk coupled to the output clutch unit and a gear portion extending axially from the disk, the disk and the gear portion defining a first axle hole for being passed therethrough by the hub axle to allow the sun gear to rotate around the hub axle;
a ring gear mounted in the cavity of the hub shell;
a plurality of planet gears;
a planet gear carrier having a second axle hole for being passed therethrough by the hub axle to allow the planet gear carrier to rotate around the hub axle, and a plurality of gear arms, each of the planet gears positioned on each of the planet gear arms in a way that it can rotate around each of the planet gear arms and is engaged respectively with the ring gear and the gear portion of the sun gear;
a resisting member disposed between the sun gear and the hub axle to apply resistance to the rotation of the sun gear;
a forward drag member disposed between the ring gear and the sun gear to apply drag to the sun gear; and
a reverse drag member disposed between the planet gear carrier and the hub axle to apply drag to the planet gear carrier.

2. The driving mechanism of claim 1, wherein the drive sleeve includes a plurality of receiving rooms integrally and angularly arranged about the periphery of the drive sleeve, each of the receiving rooms includes a first ramp and a second ramp arranged symmetrically with the first ramp, each of the ramps has a first bottom portion and a first top portion, the distance from the top portion to the axis of the hub axle is greater than the distance from the bottom portion to the axis of the hub axle; the output clutch unit includes a hub shell liner mounted on an inner wall of the cavity of the hub shell and having an engaged surface facing to the hub axle; the input clutch unit includes a plurality of cams and a retaining unit, each of the cams has a first portion, a second portion, an inner surface and an outer surface, the first portion is received in the receiving room in a way that the inner surface is in contact with the first ramp in a manner that can slide along the first ramp from the bottom portion to the top portion or the top portion to the bottom portion to enable the outer surface to engage or disengage the engaged surface of the hub shell liner; the retaining unit includes a retaining piece and a coil-spring, the retaining piece is received in one of the receiving rooms and in contact with the second ramp thereof, the coil-spring has one end inserted into the retaining piece, and a coil body encircled on the outer surface of each of the cams and the retaining piece respectively; and the disk of the sun gear is arranged adjacent to the drive sleeve and has a plurality of pockets for receiving the second portion of each of the cams.

3. The driving mechanism of claim 1, wherein the first ramp has a convex arc surface between the first bottom portion and the first top portion.

4. The driving mechanism of claim 1, wherein the outer surface of each of the cams is roughened.

5. The driving mechanism of claim 1, wherein the drive sleeve includes a plurality of receiving rooms integrally and angularly arranged about the periphery of the drive sleeve, the output clutch unit includes a hub shell liner mounted on an inner wall of the cavity of the hub shell and having an engaged surface facing to the hub axle and having a plurality of ratchet teeth and an inclined surface between two adjacent ratchet teeth; the input clutch unit includes a plurality of pawls and a retaining unit, each of the pawls has a first portion and a second portion, the first portion is received in the receiving room to move with the drive sleeve, the retaining unit is connected with each of the pawls to retain it in a first position where it not engaged with the engaged surface of the hub shell liner, and the disk of the sun gear is arranged adjacent to the drive sleeve and has a plurality of holding rooms for housing the second portion of each of the pawls, each of the holding rooms has a raised portion such that when the sun gear moves forward, the raised portion will exert an outward thrust to push each of the pawls in a second position to engage with the engaged surface of the hub shell liner.

6. The driving mechanism of claim 5, wherein each of the receiving rooms includes an arc-shaped concave base and a ramp surface extending outward from the arc-shaped concave base, each of the pawls includes a cylindrical root and a claw body extending outward from the cylindrical root, the cylindrical root is received in the arc-shaped concave base in a way that the claw body can swing between the first position and the second position.

7. The driving mechanism of claim 6, wherein the retaining unit includes a coil-spring having one end inserted into the drive sleeve and a coil body encircled on the outer surface of each of the pawls to retain each of the pawls in the first position.

8. The driving mechanism of claim 6, wherein the retaining unit includes a plurality of sheet-like springs, each of the sheet-like springs has a proximal end fixed on a wall of each of the receiving rooms of the drive sleeve and a distal end connected with the claw body of each of the pawls to retain each of the pawls in the first position.

9. The driving mechanism of claim 6, wherein the retaining unit includes a plurality of magnetic members, each of the magnetic members is embedded in the ramp surface of each of the receiving rooms to retain each of the pawls in the first position by its magnetic force.

10. The driving mechanism of claim 1, wherein the output clutch unit includes a hub shell liner mounted on an inner wall of the cavity of the hub shell and having an inner cone surface facing to the hub axle and the input clutch unit includes a first clutch member, a second clutch member and a connecting member wherein the first clutch member includes a clutch portion and a sleeve portion extending axially from one end of the clutch portion, the second clutch member includes an external threaded portion disposed on the drive sleeve, the clutch portion of the clutch device includes a threaded hole for engagement with the external threaded portion so that the clutch device can be driven by the drive sleeve to axially move along the hub axle and an outer cone surface for cooperating with the inner cone surface of the hub shell liner to form a clutching or engaging state, the sleeve portion has a through hole communicated with the threaded hole of the clutch portion so that the hub axle can pass through the first clutch device, the connecting member includes a plurality of first engaging devices disposed on the sleeve portion of the clutch device and a plurality of second engaging devices disposed on the disk of the sun gear and engaged with the first engaging devices so that the clutch device can move linearly relative to the sun gear or rotate with the sun gear.

11. The driving mechanism of claim 1, wherein the resisting member comprises a wave spring.

12. The driving mechanism of claim 1, wherein the forward drag member comprises a forward drag spring having a head end, a tail end and a helical body, the helical body encircles the disk of the sun gear in a forward direction from the head end and the tail end is embedded on the ring gear so that the forward drag spring can apply drag to the sun gear when the hub rotates forward.

13. The driving mechanism of claim 1, wherein the reverse drag member comprises a locating sleeve or liner and a reverse drag spring, the locating sleeve or liner is fitted between the planet gear carrier and the hub axle and includes an annular body having a third axle hole for being passed therethrough by the hub axle, an outer surface and an inner surface with a plurality of protrusions and elastic clips for tightly sleeving on the hub axle, the reverse drag spring has a head end, a tail end and a helical body, the helical body is coiled onto the outer surface of the annular body of locating sleeve or liner in a reverse direction from the head end and the tail end is embedded on the planet gear carrier so that the reverse drag spring can apply drag to the planet gear carrier when the hub rotates in reverse.

* * * * *